United States Patent
Moulsley

(10) Patent No.: US 10,103,860 B2
(45) Date of Patent: Oct. 16, 2018

(54) METHOD FOR DEFINING PDCCH SEARCH SPACE IN A COMMUNICATION SYSTEM USING CARRIER AGGREGATION

(75) Inventor: Timothy James Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 249 days.

(21) Appl. No.: 13/634,898

(22) PCT Filed: Mar. 24, 2011

(86) PCT No.: PCT/IB2011/051254
§ 371 (c)(1),
(2), (4) Date: Sep. 14, 2012

(87) PCT Pub. No.: WO2011/121501
PCT Pub. Date: Oct. 6, 2011

(65) Prior Publication Data
US 2013/0012203 A1    Jan. 10, 2013

(30) Foreign Application Priority Data

Apr. 2, 2010  (EP) .................................... 10305349
Apr. 7, 2010  (EP) .................................... 10305356

(51) Int. Cl.
| | | |
|---|---|---|
| H04W 4/00 | (2018.01) | |
| H04L 5/00 | (2006.01) | |
| H04W 48/16 | (2009.01) | |
| H04W 72/02 | (2009.01) | |

(52) U.S. Cl.
CPC ........... *H04L 5/0053* (2013.01); *H04W 48/16* (2013.01); *H04W 72/02* (2013.01)

(58) Field of Classification Search
CPC ..... H04W 28/04; H04W 72/04; H04W 80/04; H04W 48/16; H04W 72/02; H04L 5/0007; H04L 5/0053
USPC ......................................... 455/450, 328, 329
See application file for complete search history.

(56) References Cited

U.S. PATENT DOCUMENTS

| | | | |
|---|---|---|---|
| 2006/0281465 A1* | 12/2006 | McBeath et al. | 455/450 |
| 2007/0097853 A1* | 5/2007 | Khandekar et al. | 370/208 |
| 2007/0248037 A1* | 10/2007 | Stewart et al. | 370/328 |
| 2008/0165832 A1* | 7/2008 | Fukuda | H04B 1/7143 375/134 |

(Continued)

FOREIGN PATENT DOCUMENTS

| | | |
|---|---|---|
| CN | 101686534 A | 3/2010 |
| EP | 2193616 B1 | 7/2014 |

(Continued)

OTHER PUBLICATIONS

"Resource Allocation and PDCCH Design Issues in Carrier Aggregation", Discussion and Decision, 3GPP TSG-RAN WG1 #56, R1-090924, Feb. 9-13, 2009, p. 1-6.

(Continued)

*Primary Examiner* — Wayne H Cai

(57) ABSTRACT

The invention relates to a method for operating a secondary station to search for PDCCH in search spaces on a plurality of component carriers, wherein the component carriers comprise an anchor carrier and a plurality of other carriers and the search spaces change in a preconfigured way with the time.

18 Claims, 2 Drawing Sheets

(56) References Cited

U.S. PATENT DOCUMENTS

| | | | |
|---|---|---|---|
| 2010/0182899 A1* | 7/2010 | Leviant | H04L 27/2665 370/210 |
| 2011/0021206 A1 | 1/2011 | Baker et al. | |
| 2011/0021229 A1 | 1/2011 | Skoric et al. | |
| 2011/0044259 A1* | 2/2011 | Nimbalker et al. | 370/329 |
| 2011/0142009 A1* | 6/2011 | Lindoff | H04L 5/0053 370/332 |
| 2011/0170508 A1 | 7/2011 | Xue et al. | |

FOREIGN PATENT DOCUMENTS

| | | | |
|---|---|---|---|
| JP | 2010541367 A | 12/2010 | |
| JP | 2011518475 A | 6/2011 | |
| WO | 2009118703 A1 | 10/2009 | |
| WO | 2009120125 A1 | 10/2009 | |

OTHER PUBLICATIONS

"PDCCH Design and Monitoring Set for Carrier Aggregation", Discussion and Decision, 3GPP TSG RAN WG1 Meeting #59, TDOC R1-094990, Nov. 9-13, 2009, p. 1-5.

LG Electronics, "PDCCH Structure for Multiple Component Carriers in LTE-Advance", 3GPP RAN WG1 #56BIS, Mar. 2009, R1-091203, pp. 1-4.

Research in Motion UK Limited, "Blind Decoding for Carrier Aggregation", EGPP TSG RAN WG1 Meeting #59BIS, 2010, R1-100566, pp. 1-3.

Philips, "Analysis of Search Space Design for PDCCH Blind Decoding", 3GPP TSG RAN WG1 Meeting #52BIS, Apr. 2008, R1-081504, pp. 1-5.

\* cited by examiner

METHOD FOR DEFINING PDCCH SEARCH SPACE IN A COMMUNICATION SYSTEM USING CARRIER AGGREGATION

FIELD OF THE INVENTION

The present invention relates to a method for operating a secondary station in a mobile communication network. More specifically, the present invention relates to communication between a primary station and a secondary station, in a telecommunication network, like a cellular telecommunication network (e.g. UMTS, GSM).

This invention is, for example, relevant for Long Term Evolution (LTE) radio stations or base stations.

BACKGROUND OF THE INVENTION

In the first release of the LTE specifications (Rel-8), a single carrier of up to 20 MHz is used. A control signalling message on the Physical Downlink Control Channel (PDCCH) to signal allocations of transmission resources on either uplink or downlink. In UMTS LTE the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8.

A mobile station, like a UE in LTE, does not know in advance the location in CCE space of messages intended for it. In principle, the mobile station could attempt to blindly decode all the possible PDCCHs with different starting positions in the CCE space and thus receive any messages intended for that mobile station. However, if the CCE space is large the processing complexity is prohibitive. Therefore a more limited search is configured which consists of a number of search spaces.

A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station thus can have up to four search spaces. For example, the search space of a UE for aggregation level 1 (referred to as 1-CCE) could consist of the CCEs indexed 3, 4, 5, 6, 7, 8, while its search space for aggregation level 8 could consist of the two resource sets of aggregated CCEs consisting of the CCEs indexed by 1, 2, . . . 8 and 9, 10, . . . , 16, respectively. In this example, the UE thus performs six blind decodings for 1-CCEs and two blind decodings for 8-CCEs.

The LTE specification currently requires the UE to perform the following:
- 6 decoding attempts of 1-CCE aggregation
- 6 decoding attempts of 2-CCE aggregation
- 2 decoding attempts of 4-CCE aggregation
- 2 decoding attempts of 8-CCE aggregation The larger aggregations are intended to be used for large messages, and/or small messages when a lower code rate is required, for example under bad channel conditions. However, restricting the search spaces to reduce processing complexity limits the availability of suitable aggregations for different conditions as conditions vary.

In LTE-Advanced, this principle is extended to multiple carriers, and PDCCH signalling will be needed to indicate resource allocations on each of the component carriers (CCs). One PDCCH may indicate an allocation on the same CC or a different CC. It is agreed in RAN2 that a set of CCs may be configured, and a subset of these CCs may be "active". However, in general it is desirable to avoid having a large number of blind decodes required. This could be achieved by reducing the size of the search space on at least some CCs. In addition, where there is not data for a given UE, DRX (Discontinuous Reception) may be applied. Currently in RAN2 it is agreed that a common DRX cycle would apply to all (active) CCs.

However, further power/blind decoding savings could be achieved by only monitoring a subset of active carriers at the end of each DRX cycle. When data is actually received, more carriers would be monitored. This could be viewed as a special feature of DRX or as dynamically modifying the set of active carriers.

A further proposal under consideration in 3GPP is for one carrier to have special status (e.g. so called "anchor carrier"). Some possible distinguishing features for the anchor carrier could be:
- Common search space is monitored for broadcast control messages (not on other CCs)
- Full UE specific search space is applied (smaller search space on other CCs)
- Only PDCCH on the anchor carrier is monitored at the end of the DRX cycle A problem with defining one carrier as the "anchor carrier" is that this carrier may suddenly become unavailable, for example due to a change in interference or channel conditions.

A similar problem may arise with individual component carriers (i.e. one or more may temporarily become of low quality or unavailable).

SUMMARY OF THE INVENTION

It is an object of the invention to propose a method which alleviates the above mentioned problems.

It is another object of the present invention to propose a communication system to propose a more robust support of the PDCCH.

To this end, the method of operating a secondary station in accordance with a first aspect of the invention is characterized in that the at least one carrier that are being searched by the secondary station is changed with time in accordance with a predetermined pattern.

In one embodiment of the invention, the secondary station the particular carrier designated as "anchor carrier" changes with time in a predetermined way.

In a second embodiment of the invention, the secondary station searches a set of active carriers and the subset of configured carriers considered "active" changes with time in a predetermined way.

In a third embodiment, the secondary station searches a subset of active carriers and, the subset of active carriers which are monitored changes with time in a predetermined way. For example, the secondary station is in a DRX (Discontinuous Reception) mode and the subset of active carriers is monitored at the end of each DRX cycle, indicated by expiration of a timer.

The present invention also relates to a primary station comprising means for transmitting messages to a secondary station on specific carriers to be searched by the secondary station, wherein the carriers are changed in a predetermined way with the time.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for communicating in a network, like a cellular network. For instance, the network may be a UMTS network as depicted on FIG. 1.

Figure 1:
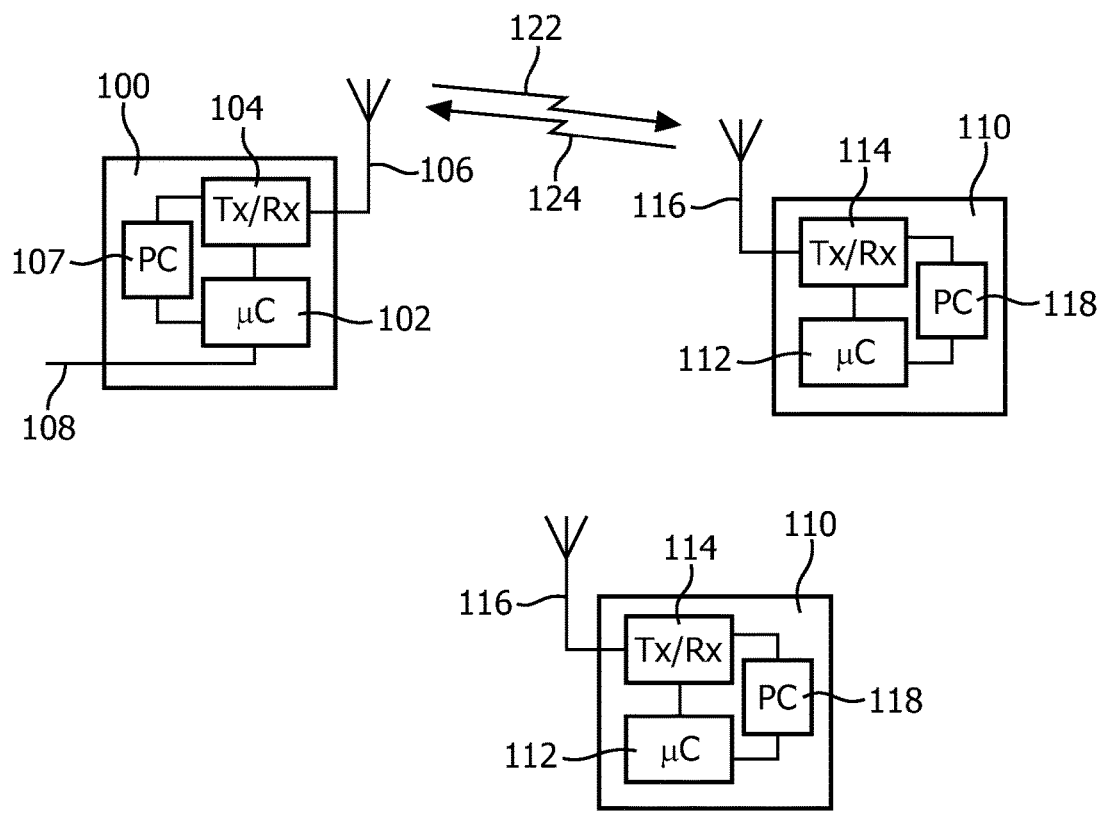
FIG. 1 is a block diagram of a system in which a first embodiment is implemented.

Referring to FIG. 1, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels, like PDCCH. Such control channels may be transmitted over a plurality of carriers. These carriers may be defined by frequency carriers or in a variant of the invention, coding modulation.

The first embodiment of the invention provides a fast and efficient means for signalling a search space (or sets of search spaces) in which control channels may be transmitted on multiple carriers for a communication system such as LTE or LTE Advanced.

In such a mobile network using a single carrier for communication with the UE, for instance in compliance with the first release of the LTE specifications (Rel-8), a single carrier of up to 20 MHz is used. A control signalling message on the Physical Downlink Control Channel (PDCCH) to signal allocations of transmission resources. Each UE is configured with a search space within which to search for such signalling messages, in order to avoid having to decode every possible location in every subframe, which would result in a very large blind decoding overhead. However, in the developments of LTE, single carrier operation is extended to multiple carriers (described as "component carriers"), and signalling will be needed to indicate resource allocations on each of the component carriers (CCs). It is desirable to avoid a significant increase in the number of blind decodes required to detect signalling on multiple CCs.

In a system like LTE-A, transmission/reception on multiple carriers is possible. However, if there is no data it is inefficient (in terms of power consumption) for the terminal to monitor all the configured carriers for control channel messages. One aspect of the invention is to designate one carrier to have special status, the anchor carrier, but the carrier with this status changes with time (e.g. in a cyclic manner). The anchor carrier can be defiend in accordance with an embodiment of the invention, as a carrier on which the secondary station searches a search space common to more than one secondary station. Another aspect of the invention is to monitor a limited set of carriers for control channel messages, but where the set changes with time.

In accordance with an illustrative embodiment of the invention, in a system like LTE-A, the following is assumed for a given UE:
more than one carrier is configured for carrier aggregation;
at least one carrier has special status i.e. anchor carrier;
a subset of the configured carriers are active.
As a variation of these assumptions:
as a special case, in particular circumstances only a subset of the of the active carriers are monitored e.g. at the end of DRX cycle in the case that a DRX mode (Discontinuous Reception mode) is employed.

It is to be noted that, for a given secondary station, an anchor carrier has special status among a plurality of configured carriers. This could be one or more of:
The identify of an anchor carrier is UE-specific;
It is always active;
The UE-specific search space on this carrier is larger than on other carriers;
The common search space is only searched on this carrier.

In accordance with a first embodiment of the invention, it is proposed the following (independent) features:
the particular carrier designated as "anchor carrier" changes with time in a predetermined way; or
the subset of configured carriers considered "active" changes with time in a predetermined way; or
the subset of active carriers which are monitored changes with time in a predetermined way.

As an example, the "change with time" could be a hopping sequence or a cyclic shift through the list of configured carriers, or active carriers, or some other set of carriers.

The details of the change of carrier (or carrier subset) with time (e.g. starting time of sequence, initial value of sequence) could be determined by higher layer signalling or by the UE ID. This latter solution means that no signaling is required. The UE ID is used to generate a pseudo-random selection of a predetermined change sequence out of a set of predetermined change sequences. The period for which the carrier (or carrier subset) remains constant (e.g. one or more subframes) could be determined in one of the same ways.

An advantage of the invention is that if a particular carrier frequency, used in one subframe, becomes unavailable or of poor quality, then a different carrier will be used in a subsequent subframe, and this may have better availability or better channel quality.

A further advantage of the invention in the case that pseudo random hopping is applied, is that UEs can access resources successively on a range of carrier frequencies without needing explicit signalling to change carriers. Moreover, this would facilitate traffic load balancing between carriers, since different sets of UEs would be accessing carriers at different times. This would apply even in the case of UEs that could only receive one carrier at a time.

Figure 2:
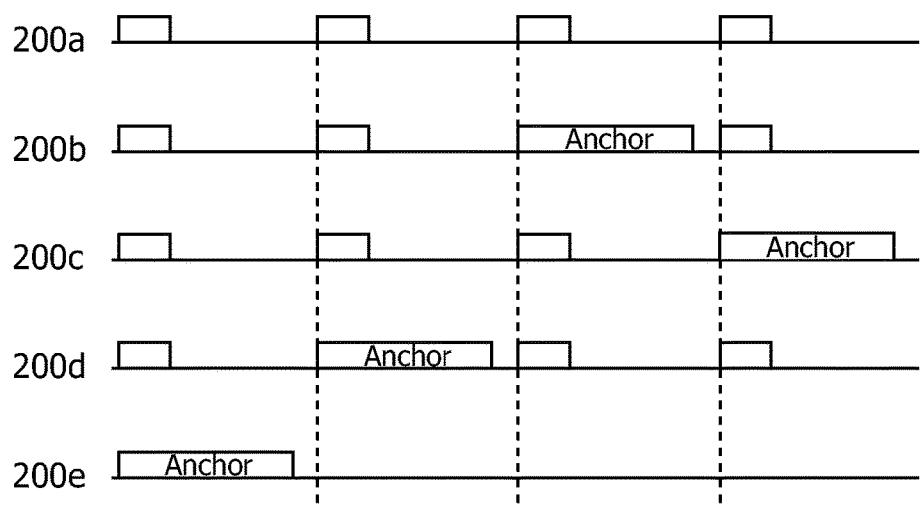
FIG. 2 is a time chart showing the changes of anchor carriers in predetermined way in accordance with an embodiment of the invention.

An exemplary embodiment of the invention is illustrated on FIG. 2. On this Figure is shown a time chart representing the search space of the secondary station 110. As shown, the search space being defined by an anchor carrier 201 and a subset of carriers 202 and 203 is changed over the time. Here, a predetermined pseudo random sequence is used to create the change of anchor carrier pattern.

It is to be noted that, in this particular example, only the anchor carrier is changed in accordance with the pseudo random sequence. The auxiliary carriers with smaller search spaces are not affected by this change in this embodiment. However, in a variant of this embodiment, a similar circular shifting can be carried out in the whole set of auxiliary carriers.

A first embodiment is a system like LTE-A. Initially a given UE may be configured for single carrier operation. Later, in a second mode of operation or under certain circumstances, for that UE a set of carriers is configured by the network for carrier aggregation. An anchor carrier is defined on which the UE should monitor for control channel messages in both a common search space and a UE specific search space. The anchor carrier changes frequency according to a defined sequence, within the set of carriers configured for carrier aggregation as was shown on FIG. 2.

A second embodiment is a system like LTE-A. Initially a given UE may be configured for single carrier operation. Later, in a second mode of operation or under certain circumstances, for that UE a set of carriers is configured by the network for carrier aggregation. At least one active carrier is defined on which the UE should monitor for control channel messages in a UE specific search space. The frequency of the monitored active carrier changes according to a defined sequence, within the set of carriers configured for carrier aggregation (or a set of active carriers).

- As a variation more than one active carrier is defined. The defined sequences for the monitored active carriers may be independent or related (e.g. same sequence with an offset).
- As a variation, applicable to both first and second embodiments, the defined sequence(s) may be pre-determined (e.g. depending on UE ID and/or cell ID), or configured by the network.
- As variation of the defined sequence, this may be defined such that the carrier frequency is constant for more than one subframe.
- As variation of the defined sequence, this may be defined such that the carrier frequency is cyclically shifted.
- The first and second embodiments may be combined.

Figure 3:
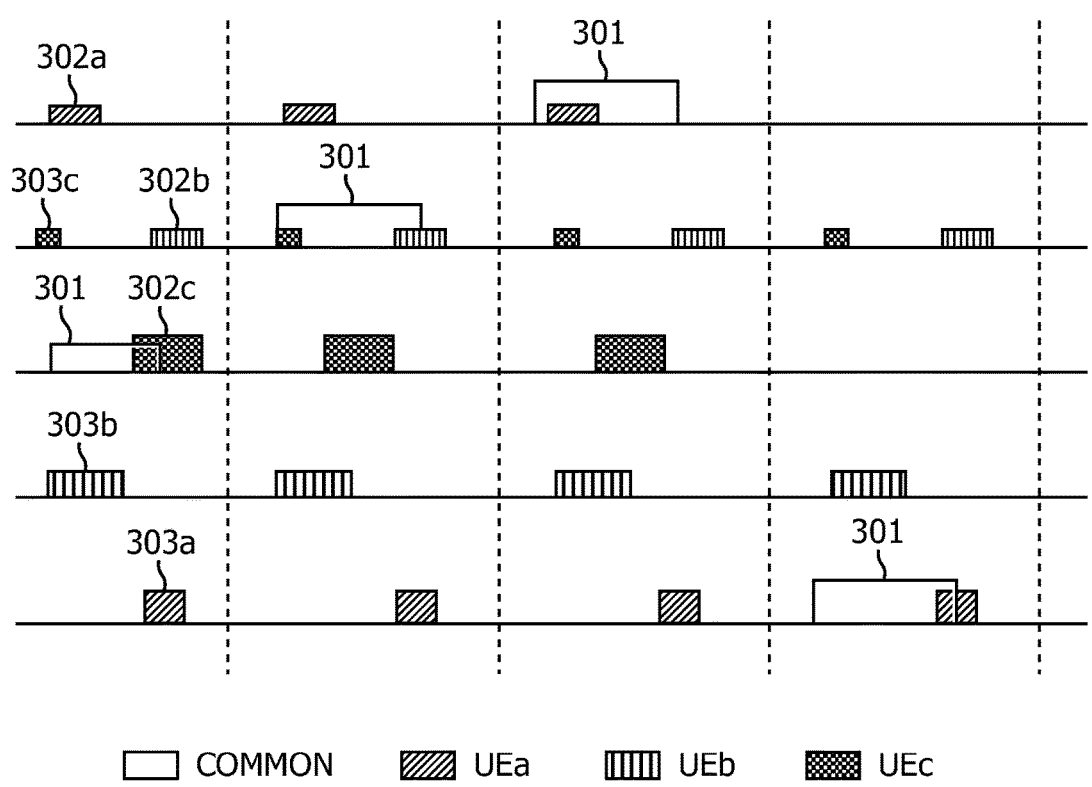
FIG. 3 is a time chart showing the changes of anchor carriers in predetermined way in accordance with an embodiment of the invention.

A further embodiment is a system like LTE-A. Initially a given UE may be configured for single carrier operation. Later, for that UE a set of carriers is configured by the network for carrier aggregation. For that UE a part of the search space structure is defined for sending common signalling to more than one UE (common search space 301) and a part is defined for sending dedicated signaling to that UE (UE-specific search spaces for the secondary stations UEa, UEb, and UEc respectively comprises the couples of subspaces 302a and 303a, 302b and 303b, 302c and 303c). These parts may overlap. In a variation shown on FIG. 3, the part of the common search space searched by a given UE is restricted to one carrier while the UE-specific search space may extend across the set of carriers. As illustrated on FIG. 3, the carrier with the part of the common search space searched by the UE can change with time in a predetermined way. Moreover, at least one of the UE-specific subspaces 302a, 302b and 302c of the search space structure is larger on one carrier than on at least one of the others. This may be the same carrier as the one carrying the part of the common search space searched by the UE. In a further variation the carrier with the UE-specific search space changes with time in a predetermined way. This may change in the same way as the part of the common search space searched by the UE.

In each of the above embodiments, the mode of operation described may be the default operation mode. However, this mode of operation may also be operative only under some circumstances, for example, when the channel conditions are non-uniform (i.e. with large differences in channel quality between carriers), or when the channel occupancy increases and is above a predetermined threshold.

In the exemplary embodiments, the search space is searched by the secondary station and the primary station configures the change in the structure of the search space. However, the roles of the primary station and of the secondary station may be exchanged.

The invention has particular, but not exclusive, application to wireless communication systems that employ multiple modes of transmission between a primary and secondary station, most notably MIMO and MU-MIMO modes. Examples include cellular systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a first and second secondary station of a plurality of secondary stations, the method comprising:
   in the first secondary station:
      searching by a processor of the first secondary station of at least a first carrier of a predetermined set of carriers received via a transceiver, the first carrier having a search space having a first structure; and
      switching by the processor at least a second carrier of the predetermined set of carriers for the first carrier of the predetermined set of carriers via selection in a predetermined way as a function of time with respect to a predetermined timing reference independent of the reception by the first secondary station of a data transmission corresponding to a message received via the search space, and
   wherein the switching by the processor of the first secondary station is different to the switching by the processor of the second secondary station,
   wherein the second carrier has a carrier frequency that is different from a carrier frequency of the first carrier,
   wherein the predetermined set of carriers is the same for both the first and second secondary stations, and
   wherein both the first carrier and the second carrier are among the predetermined set of carriers and only one of the first carrier and the second carrier has a search space that is common to both the first secondary station and the second secondary station.

2. A secondary station comprising:
a transceiver,
an antenna coupled to the transceiver configured to receive at least a first carrier of a predetermined set of carriers,
a processor configured to search at least the received first carrier of the predetermined set of carriers with a search space having a first structure,
wherein a second carrier of the predetermined set of carriers is switched for the first carrier via a selection in a predetermined way as a function of time with respect to a predetermined timing reference independent of the reception by the secondary station of a data transmission corresponding to a message received via the search space, and
wherein the second carrier has a carrier frequency that is different from a carrier frequency of the first carrier,
wherein the predetermined set of carriers is the same for both the second secondary station and a plurality of other secondary stations, and
wherein the switching of the first carrier for the second carrier is different for different secondary stations, and
wherein both the first carrier and the second carrier are among the predetermined set of carriers and only one of the first carrier and the second carrier has a search space that is common to both the first secondary station and the second secondary station.

3. The secondary station of claim 2, comprising the secondary station searching at least the second carrier of the plurality carriers with a search space having a second structure.

4. The secondary station of claim 2, wherein first carrier is an anchor carrier.

5. The secondary station of claim 2,
wherein the secondary station searches on a set of active carriers among the plurality of carriers, and
wherein the second carrier of the plurality of carriers is substituted for the first carrier by changing the carriers selected as the set of active carriers as a function of time.

6. The secondary station of claim 2, wherein the secondary station searches on a subset of active carriers among a set of active carriers among the plurality of carriers, and
wherein the second carrier of the plurality of carriers is substituted for the first carrier by changing the selected subset of active carriers that are searched as a function of time.

7. The secondary station of claim 6,
wherein the secondary station operates in a discontinuous manner according to a Discontinuous Reception Cycle Timer, and
wherein the secondary station searches the subset of active carriers at the end of each Discontinuous Reception Cycle.

8. The secondary station of claim 2, wherein the second carrier of the plurality of carriers is substituted for the first carrier, in accordance with a preconfigured frequency hopping scheme on a plurality of component carriers.

9. The secondary station of claim 8, wherein the substitution of the second carrier of the plurality of carriers for the first carrier, isconfigured by a primary station by selection of a predetermined change scheme out of a set of predetermined change schemes.

10. The secondary station of claim 2, wherein the substitution via selection of the second carrier of the plurality of carriers for the first carrier, is configured by the network during network operation.

11. The secondary station of claim 2, wherein the substitution of the second carrier of the plurality of carriers for the first carrier, is via a predetermined selection.

12. The secondary station of claim 11, wherein the first structure of the search space comprises a second search subspace which is specific to the secondary station, the second search subspace being on a second carrier, and wherein the second carrier of the plurality of carriers is substituted via selection over time.

13. The secondary station of claim 12, wherein the first carrier and the second carrier are the same carrier.

14. The secondary station of claim 2, wherein the first structure of the search space comprises a first search subspace on at least one carrier which is common to a plurality of secondary stations, wherein at least part of the common search subspace is on the first carrier.

15. The secondary station of claim 14,
wherein the first structure comprises a third search subspace specific to the secondary station, and
wherein the third search subspace is smaller than the second search subspace, and
wherein the third search subspace is on a carrier which is not substituted when the second carrier is substituted for the first carrier.

16. The secondary station of claim 2 comprising a base station.

17. The secondary station of claim 2 comprising a mobile station.

18. A non-transitory computer-readable storage-medium having stored thereon instructions that when executed cause processing circuitry of a secondary station to:
search by a processor of the secondary station at least a first carrier of a predetermined set of carriers received via a transceiver, the first carrier having a search space having a first structure; and
switch by the processor at least a second carrier of the predetermined set of of carriers for the first carrier of the plurality of carriers via selection in a predetermined way as a function of time with respect to a predetermined timing reference independent of the reception by the secondary station of a data transmission corresponding to a message received via the search space,
wherein the second carrier has a carrier frequency that is different from a carrier frequency of the first carrier,
wherein the switching by the processor of the first secondary station is different to the switching by the processor of the second stationary station,
wherein the predetermined set of carriers is the same for both the first and second secondary stations, and
wherein both the first carrier and the second carrier are among the predetermined set of carriers and only one of the first carrier and the second carrier has a search space that is common to both the first secondary station and the second secondary station.

* * * * *